United States Patent
Kawajiri et al.

(10) Patent No.: US 8,866,431 B2
(45) Date of Patent: Oct. 21, 2014

(54) MOTOR DRIVE CONTROL APPARATUS

(75) Inventors: Kiyonari Kawajiri, Chiyoda-ku (JP);
Toshiki Tanaka, Chiyoda-ku (JP);
Shuya Sano, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 80 days.

(21) Appl. No.: 13/319,423

(22) PCT Filed: May 15, 2009

(86) PCT No.: PCT/JP2009/059073
§ 371 (c)(1), (2), (4) Date: May 28, 2009

(87) PCT Pub. No.: WO2010/131361
PCT Pub. Date: Nov. 18, 2010

(65) Prior Publication Data
US 2012/0049779 A1    Mar. 1, 2012

(51) Int. Cl.
*G05B 5/01* (2006.01)
*G05B 9/02* (2006.01)
*H02P 23/00* (2006.01)

(52) U.S. Cl.
CPC .............. *G05B 9/02* (2013.01); *H02P 23/0068* (2013.01); *H02P 23/005* (2013.01)
USPC ..... 318/611; 318/619; 318/568.22; 358/1.15; 358/426.09; 358/446; 709/224; 701/50; 700/28; 700/170

(58) Field of Classification Search
CPC .... G05B 19/237; G05B 19/404; G05B 19/19; G05B 19/232; G05B 2219/41021; G05B 5/01; G05B 13/024; G05B 13/042; G05B 11/42; G05B 21/02; G05B 23/0221; G05B 13/0245; G05B 13/0275; G05B 19/075; G05D 3/1445; G05D 3/122; H02P 29/0038; H02P 6/10; H02P 6/14; F16F 15/02; B62D 5/046; H02K 29/08; H02P 6/08; H04N 1/401; H04N 1/4072; H04N 1/4076; H04N 1/40056; H04N 1/40; B01D 53/8631; B01D 53/90; G01J 3/45; B25J 9/1633
USPC ........... 318/611, 400.23, 568.22, 619, 41, 50; 709/224; 701/50; 123/568.21; 348/211.1; 375/345, 350, 355, 296; 700/28, 170; 358/1.15, 426.09, 446
See application file for complete search history.

(56) References Cited

U.S. PATENT DOCUMENTS 6,295,084 B1 * 9/2001 Nishizawa et al. ........ 348/211.1
6,885,927 B2 * 4/2005 Arimura ..................... 701/41

(Continued)

FOREIGN PATENT DOCUMENTS

CN  1353397 A   6/2002
JP  7-271441 A  10/1995

(Continued)

OTHER PUBLICATIONS

Taiwan Office Action; Jan. 8, 2013.

(Continued)

*Primary Examiner* — Shawki S Ismail
*Assistant Examiner* — Jorge L Carrasquillo
(74) *Attorney, Agent, or Firm* — Sughrue Mion, PLLC

(57) ABSTRACT

A host apparatus includes a command-pattern changing unit. A detector includes a detector-communication-parameter changing unit. A motor drive control apparatus includes a communication-parameter changing unit and a control-gain changing unit. The command-pattern changing unit, the detector-communication-parameter changing unit, and the communication-parameter changing unit change, based on determination of detector communication by a communication-abnormality determining unit, plural communication parameters, control gains, and command patterns, which are determined in advance, in synchronization with one another to control drive of a motor.

9 Claims, 11 Drawing Sheets

(56) References Cited

U.S. PATENT DOCUMENTS

| | | | |
|---|---|---|---|
| 7,006,260 B2 * | 2/2006 | Sato et al. | 358/448 |
| 8,279,984 B1 * | 10/2012 | Sutardja | 375/345 |
| 2002/0075529 A1 | 6/2002 | Sato et al. | |
| 2003/0200018 A1 | 10/2003 | Arimura | |
| 2004/0007221 A1 * | 1/2004 | McConnell | 123/568.21 |
| 2007/0043853 A1 * | 2/2007 | Rustad et al. | 709/224 |
| 2007/0050115 A1 * | 3/2007 | Discenzo et al. | 701/50 |

FOREIGN PATENT DOCUMENTS

| | | |
|---|---|---|
| JP | 11275172 | 10/1999 |
| JP | 2002-244949 A | 8/2002 |
| JP | 2002244949 A * | 8/2002 |
| JP | 2003-319678 A | 11/2003 |
| JP | 2003319678 A * | 11/2003 |
| JP | 2006-171878 A | 6/2006 |
| JP | 2006-262581 A | 9/2006 |
| TW | 200524263 A | 7/2005 |
| WO | 2009/057545 A1 | 5/2009 |

OTHER PUBLICATIONS

Japanese Office Action mailed Apr. 30, 2013, issued in Japanese Patent Application No. 2011-513196.
Korean Office Action for Korean Patent Application No. 10-2011-7026979 mailed Sep. 30, 2013.
Office Action in Chinese Patent Application No. 200980159290.1 mailed Oct. 28, 2013.

* cited by examiner

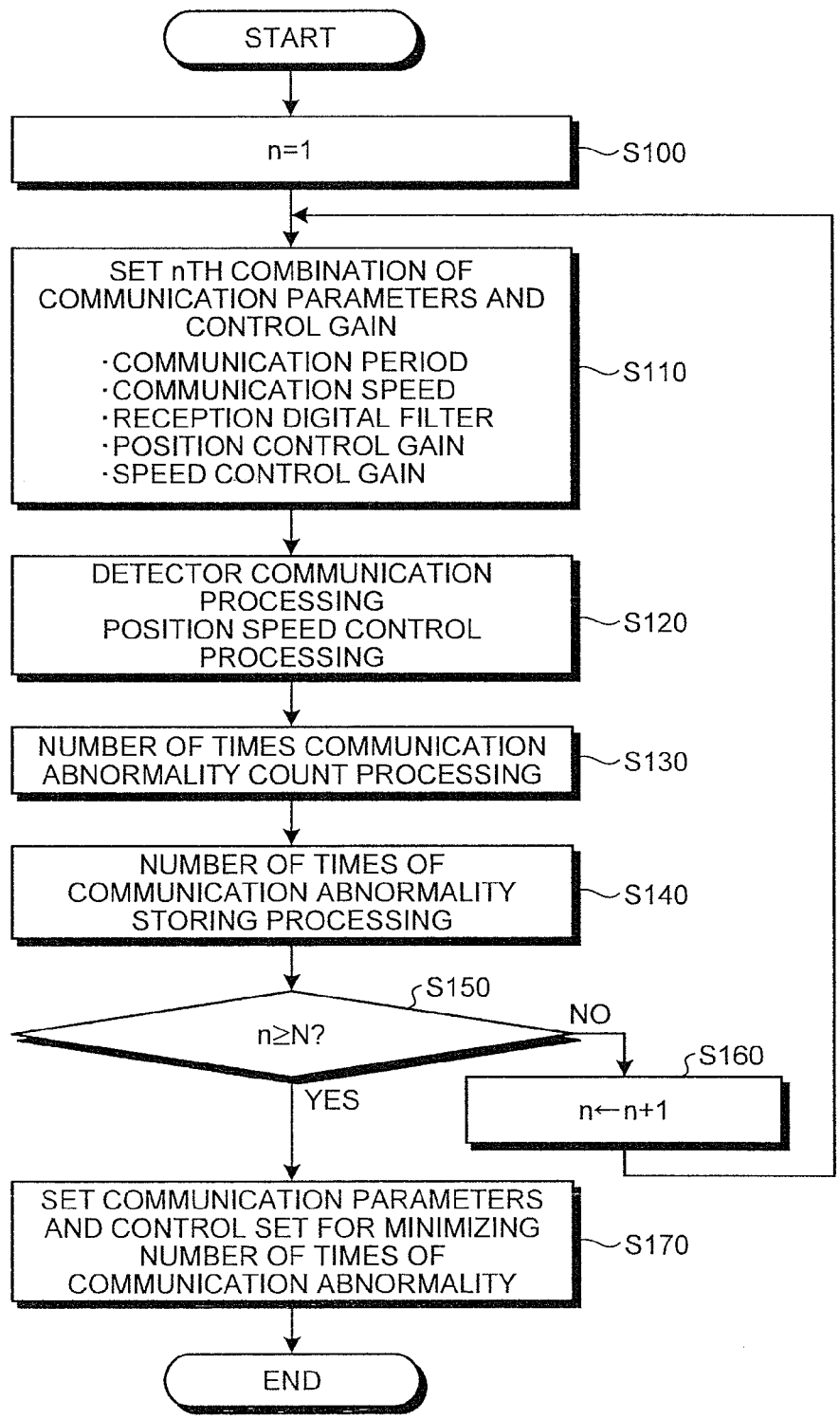

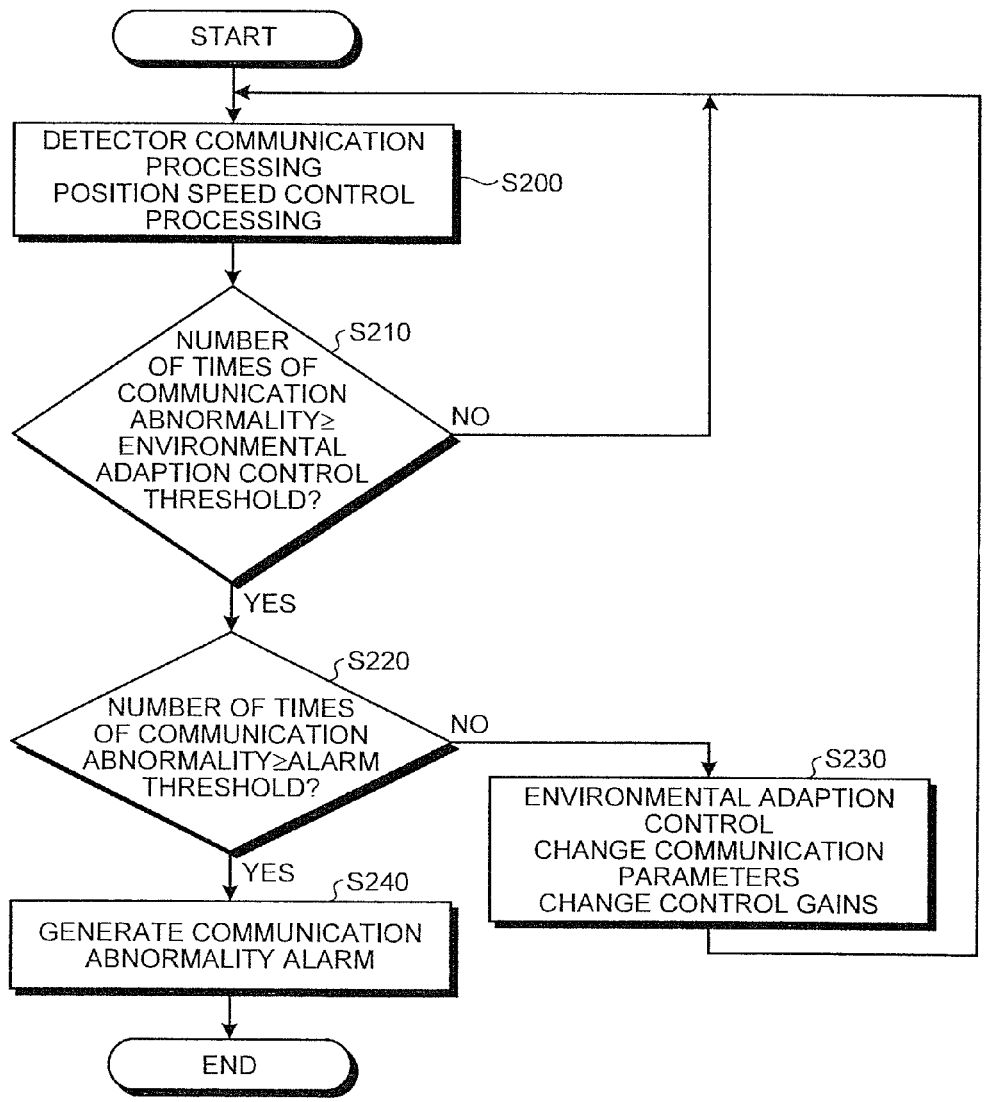

MOTOR DRIVE CONTROL APPARATUS

CROSS REFERENCE TO RELATED APPLICATION

This application is a National Stage of International Application No. PCT/JP2009/059073 filed May 15, 2009, the contents of all of which are incorporated herein by reference in their entirety.

FIELD

The present invention relates to a motor drive control apparatus, and, more particularly to a motor drive control apparatus that performs motor drive control based on a reception result of communication data.

BACKGROUND

Under a communication environment between a motor drive control apparatus and a position information detector, if a rate of occurrence of communication abnormality is high, a motor could stop. Therefore, communication speed could be changed according to the rate of occurrence of communication abnormality.

For example, as a control method for changing communication speed according to a rate of occurrence of communication abnormality for the purpose of securing communication reliability, there is a technology disclosed in Patent Literature 1. In the technology disclosed in Patent Literature 1, the number of times of communication abnormality is counted under a communication environment in which communication abnormality occurs and, when the number of times of abnormality reaches a certain threshold, communication speed is changed, whereby communication reliability is always secured.

CITATION LIST

Patent Literature

Patent Literature 1: Japanese Patent Application Laid-open No. H11-275172

SUMMARY

Technical Problem

However, according to the technology in the past, when communication speed is reduced under the communication environment between the motor drive control apparatus and the position information detector, a data transfer time from the position information detector increases. Therefore, a delay time until the motor drive control apparatus acquires position information from the position information detector increases and a useless time of a digital control system increases. As a result, under a condition in which a command pattern and a control gain are the same, there is a problem in that the operation of the motor becomes unstable because stability of a motor drive control system is spoiled, overshoot of motor speed increases, and rotation unevenness of a motor increases.

On the other hand, to deal with communication abnormality between the motor drive control apparatus and the position detector without changing communication speed, a system configuration based on worst cases of a cable length of a communication path, immunity, and the like is adopted. Therefore, there is a problem in that the communication speed falls and responsiveness of control is hindered.

The present invention has been devised in view of the above and it is an object of the present invention to obtain a motor drive control apparatus that can secure communication reliability even when a rate of occurrence of communication abnormality is high and prevent, without deteriorating responsiveness of control, the operation of a motor from becoming unstable.

Solution to Problem

In order to solve the aforementioned problems and attain the aforementioned object, the motor drive control apparatus is provided with: a control-gain changing unit that changes control gains; a communication-parameter changing unit that changes communication parameters; a communication-abnormality determining unit that determines abnormality of a communication state; and an environmental-adaptation control unit that instructs, based on a determination result of the communication-abnormality determining unit, the control-gain changing unit and the communication-parameter changing unit to change the control gains and the communication parameters in synchronization with each other.

Advantageous Effects of Invention

According to the present invention, there is an effect that it is possible to obtain a motor drive control apparatus that can secure communication reliability even when a rate of occurrence of communication abnormality is high and prevent, without deteriorating responsiveness of control, the operation of a motor from becoming unstable.

BRIEF DESCRIPTION OF DRAWINGS

FIG. 3 is a flowchart for explaining the operation in an initial setting mode of the environmental-adaptation control unit shown in FIG. 1.

FIG. 4 is a flowchart for explaining the operation in an environmental adaptation control mode of the environmental-adaptation control unit shown in FIG. 1.

DESCRIPTION OF EMBODIMENTS

Embodiments of a motor drive control apparatus according to the present invention are explained in detail below based on the drawings. The present invention is not limited by the embodiments.

First Embodiment

Figure 1:
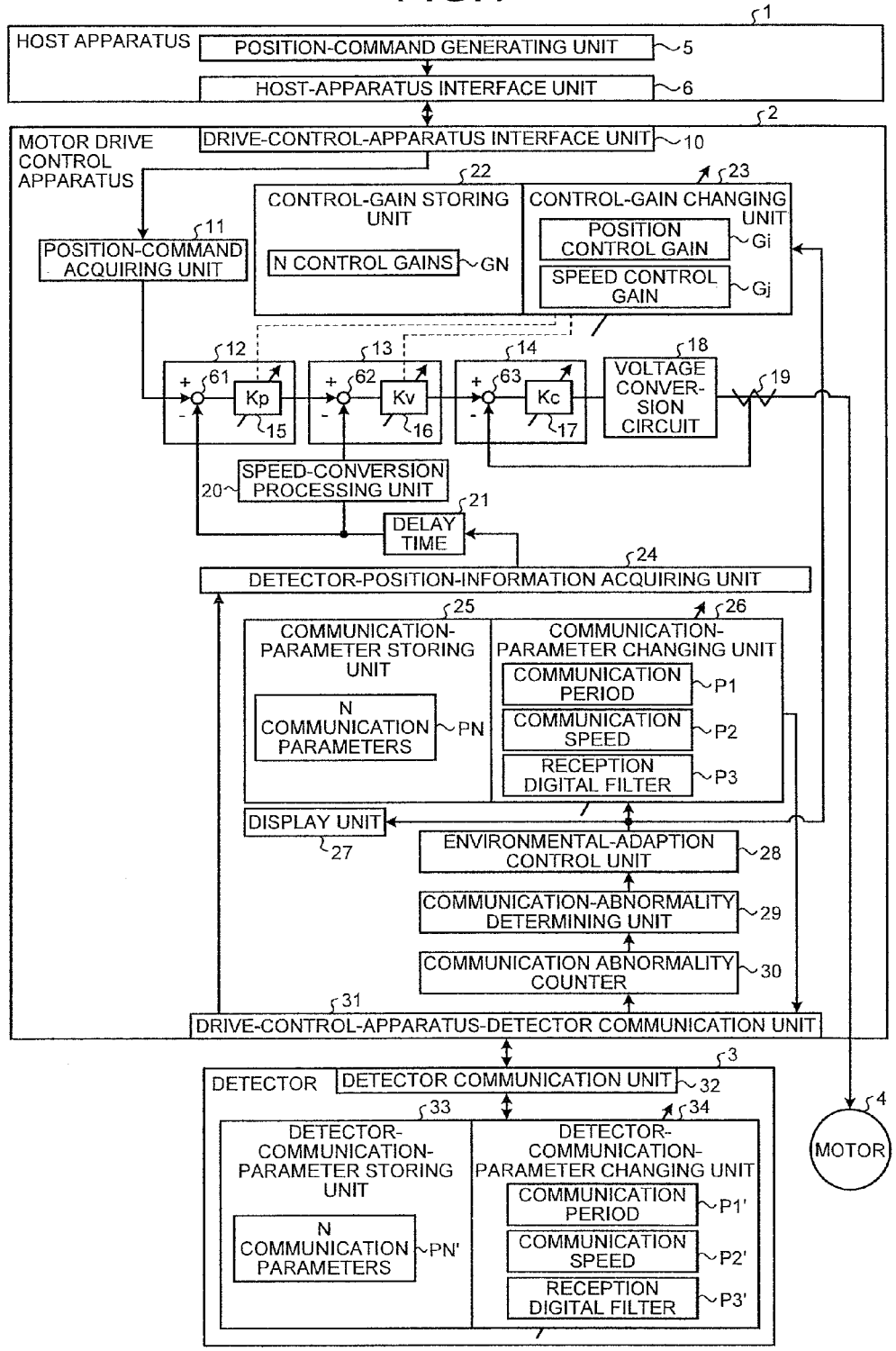
FIG. 1 is a block diagram of a schematic configuration of a first embodiment of a motor drive control apparatus according to the present invention.

FIG. 1 is a block diagram of a schematic configuration of a first embodiment of the motor drive control apparatus according to the present invention. In FIG. 1, a motor drive control apparatus 2 includes a drive-control-apparatus interface unit 10, a position-command acquiring unit 11, a position-control processing unit 12, a speed-control processing unit 13, a current-control processing unit 14, a voltage conversion circuit 18, a current detector 19, a speed-conversion processing unit 20, a control-gain storing unit 22, a control-gain changing unit 23, a detector-position-information acquiring unit 24, a communication-parameter storing unit 25, a communication-parameter changing unit 26, a display unit 27, an environmental-adaptation control unit 28, a communication-abnormality determining unit 29, a communication abnormality counter 30, and a drive-control-apparatus-detector communication unit 31.

A host apparatus 1 includes a position-command generating unit 5 and a host-apparatus interface unit 6. A detector 3 includes a detector communication unit 32, a detector-communication-parameter storing unit 33, and a detector-communication-parameter changing unit 34.

The motor drive control apparatus 2 is connected to the host apparatus 1 via the drive-control-apparatus interface unit 10, connected to the detector 3 via the drive-control-apparatus-detector communication unit 31, and connected to a motor 4 via the voltage conversion circuit 18.

The host apparatus 1 can communicate a position command to the motor drive control apparatus 2. The detector 3 can detect the position of the motor 4 and transmit position information of the motor 4 to the motor drive control apparatus 2. The motor drive control apparatus 2 can subject the motor 4 to drive control based on the position command communicated from the host apparatus 1 and the position information of the motor 4 transmitted from the detector 3.

In the motor drive control apparatus 2, the drive-control-apparatus interface unit 10 can perform mediation of communication with the host apparatus 1.

The position-command acquiring unit 11 can extract the position command from data received via the drive-control-apparatus interface unit 10 and pass the position command to the position-control processing unit 12.

The position-control processing unit 12 can form a position feedback loop based on the position command received from the position-command acquiring unit 11 and the position information detected by the detector 3 and generate a speed command. The position-control processing unit 12 includes a position-control-gain multiplier 15 and a subtracter 61. The subtracter 61 can subtract the position information detected by the detector 3 from the position command received from the position-command acquiring unit 11 and output a result of the subtraction to the position-control-gain multiplier 15. The position-control-gain multiplier 15 can multiply the output from the subtracter 61 with a position control gain Kp to generate a speed command. Note that the position control gain Kp can determine responsiveness of position feedback loop processing.

The speed-conversion processing unit 20 can convert the position information of the motor 4 detected by the detector 3 into speed information and output the speed information to the speed-control processing unit 13. The position information of the motor 4 sent to the position-control processing unit 12 and the speed-conversion processing unit 20 may involve a delay time 21. The delay time 21 is time obtained by totaling an operation time of a CPU and a waste time included in a loop such as a detection waste time due to a digital speed detection system in which the detector 3 is used.

The speed-control processing unit 13 can form a speed feedback loop based on both the speed command received from the position-control processing unit 12 and the speed information received from the speed-conversion processing unit 20 and generate a torque command. The speed-control processing unit 13 includes a speed-control-gain multiplier 16 and a subtracter 62. The subtracter 62 can subtract the speed information received from the speed-conversion processing unit 20 from the speed command received from the position-control processing unit 12 and output a result of the subtraction to the speed-control-gain multiplier 16. The speed-control-gain multiplier 16 can multiply the output from the subtracter 62 with a speed control gain Kv to generate a torque command. The speed control gain Kv can determine responsiveness of speed feedback loop processing.

The current detector 19 can detect a motor current supplied to the motor 4 and output a detection value of the motor current to the current-control processing unit 14.

The current-control processing unit 14 can form a current feedback loop based on the torque command received from the speed-control processing unit 13 and the detection value of the motor current received from the current detector 19 and generate a voltage command. The current-control processing unit 14 includes a current-control-gain multiplier 17 and a subtracter 63. The subtracter 63 can subtract the detection value of the motor current received from the current detector 19 from the torque command received from the speed-control processing unit 13 and output a result of the subtraction to the current-control-gain multiplier 17. The current-control-gain multiplier 17 can multiply the output from the subtracter 63 with a current control gain Kc to generate a voltage command. The current control gain Kc can determine responsiveness of current feedback loop processing.

The voltage conversion circuit 18 can convert the voltage command output from the current-control processing unit 14 into a motor current and output the motor current to the motor 4.

The control-gain storing unit 22 can store N (N is a positive integer) control gains GN in advance.

The control-gain changing unit 23 can set, based on environmental adaptation control information from the environmental-adaptation control unit 28, any ones of the N control gains GN stored in the control-gain storing unit 22 as a position control gain Gi and a speed control gain Gj and change the position control gain Kp of the position-control processing unit 12 and the speed control gain Kv of the speed-control processing unit 13 respectively to the position control gain Gi and the speed control gain Gj. The environmental adaptation control means control for, in communication with the detector 3, communication parameters (a communication period, communication speed, and a reception digital filter) and control gains (a position control gain and a speed control gain) in synchronization with each other based on the number of times of communication abnormality caused by communication environments such as noise and communication cable length. The environmental adaptation control information can include the communication parameters and the control gains to be changed and information concerning switching timing.

The drive-control-apparatus-detector communication unit 31 can perform serial communication with the detector 3 and receive position information detected by the detector 3.

The detector-position-information acquiring unit 24 can extract the position information from data received via the drive-control-apparatus-detector communication unit 31 and pass the position information to the position-control processing unit 12 and the speed-conversion processing unit 20.

The communication-parameter storing unit 25 can store N communication parameters PN in advance.

The communication-parameter changing unit 26 can change, based on the environmental adaptation control information from the environmental-adaptation control unit 28, a communication parameter used for communication with the detector 3 to any one of the N communication parameters PN stored in the communication-parameter storing unit 25. Examples of the communication parameters PN include a communication period P1, communication speed P2, and a reception digital filter P3.

The communication abnormality counter 30 can count, in communication with the detector 3, the number of times of communication abnormality at a predetermined period.

The communication-abnormality determining unit 29 can determine, based on a result of the count by the communication abnormality counter 30, abnormality of a state of communication with the detector 3.

The environmental-adaptation control unit 28 can instruct, based on a determination result of the communication-abnormality determining unit 29, the control-gain changing unit 23 and the communication-parameter changing unit 26 to change the control gains (the position control gain Kp and the speed control gain Kv) of the position-control processing unit 12 and the speed-control processing unit 13 and the communication parameters (the communication period P1, the communication speed P2, and the reception digital filter P3) used in communication with the detector 3 in synchronization with each other.

The display unit 27 can display an alarm or the like for informing abnormality of the detector 3 and display other various kinds of information.

In the host apparatus 1, the position-command generating unit 5 can generate a position command used for drive control for the motor 4.

The host-apparatus interface unit 6 can perform mediation of communication with the motor drive control apparatus 2.

In the detector 3, the detector communication unit 32 can perform serial communication with the motor drive control apparatus 2 and transmit position information detected by the detector 3 to the motor drive control apparatus 2.

The detector-communication-parameter storing unit 33 can store N communication parameters PN' in advance.

The detector-communication-parameter changing unit 34 can change, based on a change command from the communication-parameter changing unit 26, a communication parameter used for communication with the motor drive control apparatus 2 to any one of the N communication parameters PN' stored in the detector-communication-parameter storing unit 33. Examples of the communication parameters PN' include a communication period P1', communication speed P2', and a reception digital filter P3'. The communication period P1', the communication speed P2', and the reception digital filter P3' changed by the detector-communication-parameter changing unit 34 can be associated with the communication period P1, the communication speed P2, and the reception digital filter P3 changed by the communication-parameter changing unit 26.

The position command generated by the position-command generating unit 5 is set from the host apparatus 1 to the motor drive control apparatus 2 via the host-apparatus interface unit 6. When the position command is sent to the motor drive control apparatus 2, the position command is received via the drive-control-apparatus interface unit 10 and sent to the position-command acquiring unit 11. In the position-command acquiring unit 11, the position command is extracted from data received via the drive-control-apparatus interface unit 10 and passed to the position-control processing unit 12.

On the other hand, the position information of the motor 4 detected by the detector 3 is sent from the detector 3 to the motor drive control apparatus 2 via the detector communication unit 32. When the position information of the motor 4 is sent to the motor drive control apparatus 2, the position information is received via the drive-control-apparatus-detector communication unit 31 and sent to the detector-position-information acquiring unit 24. In the detector-position-information acquiring unit 24, the position information of the motor 4 is extracted from data received via the drive-control-apparatus-detector communication unit 31 and passed to the position-control processing unit 12 while involving the delay time 21.

When the position command generated by the position-command generating unit 5 and the position information of the motor 4 detected by the detector 3 are sent to the position-control processing unit 12, after the position information is subtracted from the position command by the subtracter 61, an output from the subtracter 61 is multiplied with the position control gain Kp by the position-control-gain multiplier 15, whereby a speed command is generated and output to the speed-control processing unit 13.

The position information of the motor 4 extracted by the detector-position-information acquiring unit 24 is passed to the speed-conversion processing unit 20 while involving the delay-time 21. When the position information of the motor 4 is sent to the speed conversion processing unit 20, the position information is converted into speed information and output to the speed-control processing unit 13.

When the speed command output from the position-control processing unit 12 and the speed information output from the speed-conversion processing unit 20 are sent to the speed-control processing unit 13, after the speed information is subtracted from the speed command by the subtracter 62, an output of the subtracter 62 is multiplied with the speed control gain Kv by the speed-control-gain multiplier 16, whereby a torque command is generated and output to the current-control processing unit 14.

On the other hand, the motor current supplied to the motor 4 via the voltage conversion circuit 18 is detected by the current detector 19 and output to the current-control processing unit 14. When the torque command output from the speed-control processing unit 13 and the detection value of the motor current output from the current detector 19 are output to the current-control processing unit 14, after the detection value of the motor current is subtracted from the torque command by the subtracter 63, an output of the subtracter 63 is multiplied with the current control gain Kc by the current-control-gain multiplier 17, whereby a voltage command is generated and output to the voltage conversion circuit 18.

When the voltage command is output to the voltage conversion circuit 18, the voltage command is converted into a motor current and then output to the motor 4.

When the position information of the motor 4 is sent to the drive-control-apparatus-detector communication unit 31, the number of times of communication abnormality at a predetermined period is counted by the communication abnormality counter 30 and a result of the count is sent to the communication-abnormality determining unit 29. In the communication-abnormality determining unit 29, abnormality of a state of communication with the detector 3 is determined based on the result of the count by the communication abnormality counter 30. A result of the determination is sent to the environmental-adaptation control unit 28.

The environmental-adaptation control unit 28 instructs, based on the determination result of the communication-abnormality determining unit 29, the control-gain changing unit 23 to change the position control gain Kp of the position-control processing unit 12 and the speed control gain Kv of the speed-control processing unit 13 and instructs the communication-parameter changing unit 26 to change the communication period P1, the communication speed P2, and the reception digital filter P3 set for communication with the detector 3. The environmental-adaptation control unit 28 instructs the control-gain changing unit 23 and the communication-parameter changing unit 26 to change the position control gain Kp and the speed control gain Kv and the communication period P1, the communication speed P2, and the reception digital filter P3 in synchronization with each other.

When the control-gain changing unit 23 is instructed to change the position control gain Kp and the speed control gain Kv, any ones of the N control gains GN stored in the control-gain storing unit 22 are set as the position control gain Gi and the speed control gain Gj. The position control gain Kp and the speed control gain Kv are respectively changed to the position control gain Gi and the speed control gain Gj.

When the communication-parameter changing unit 26 is instructed to change the communication period P1, the communication speed P2, and the reception digital filter P3, any ones of the N communication parameters PN stored in the communication-parameter storing unit 25 are changed as the communication period P1, the communication speed P2, and the reception digital filter P3.

The position control gain Kp and the speed control gain Kv and the communication period P1, the communication speed P2, and the reception digital filter P3 are changed in synchronization with each other, whereby, even when a rate of occurrence of communication abnormality in communication with the detector 3 is high, it is possible to secure communication reliability and prevent the operation of the motor 4 from becoming unstable without deteriorating responsiveness of motor drive control.

Figure 2:
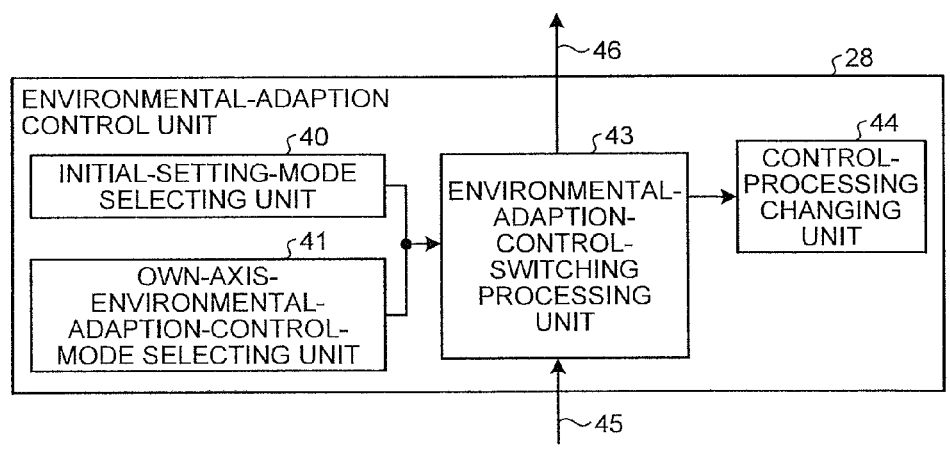
FIG. 2 is a block diagram of a schematic configuration of an environmental-adaptation control unit shown in FIG. 1.

FIG. 2 is a block diagram of a schematic configuration of the environmental-adaptation control unit shown in FIG. 1. In FIG. 2, the environmental-adaptation control unit 28 includes an initial-setting-mode selecting unit 40, an own-axis-environmental-adaptation-control-mode selecting unit 41, an environmental-adaptation-control-switching processing unit 43, and a control-processing changing unit 44.

When an initial setting mode is selected, the initial-setting-mode selecting unit 40 can instruct the environmental-adaptation-control-switching processing unit 43 to operate in the initial setting mode. When an own axis environmental adaptation control mode is selected, the own-axis-environmental-adaptation-control-mode selecting unit 41 can instruct the environmental-adaptation-control-switching processing unit 43 to operate in the own axis environmental adaptation control mode.

When the own axis environmental adaptation control mode is selected, the environmental-adaptation-control-switching processing unit 43 can change, based on own axis communication state information 45 corresponding to the number of times of communication abnormality from the communication-abnormality determining unit 29, the position control gain Kp and the speed control gain Kv and the communication period P1, the communication speed P2, and the reception digital filter P3 in synchronization with each other when the number of times of communication abnormality meets a condition set in advance. To change the position control gain Kp and the speed control gain Kv and the communication period P1, the communication speed P2, and the reception digital filter P3 in synchronization with each other, the environmental-adaptation-control-switching processing unit 43 can output environmental adaptation control information 46 to the communication-parameter changing unit 26 and the control-gain changing unit 23.

When the initial setting mode is selected, the environmental-adaptation-control-switching processing unit 43 can check an operation state during the environmental adaptation control beforehand by simulating a motor operation in an environmental adaptation control state.

The control-processing changing unit 44 can perform a change of necessary processing involved in a change of communication control timing.

FIG. 3 is a flowchart for explaining the operation in the initial setting mode of the environmental-adaptation control unit shown in FIG. 1. There are N each of communication parameters (a communication period, communication speed, and a reception digital filter) and control gains (a position control gain and a speed control gain) determined in advance.

In FIG. 3, when the initial setting mode is selected, the environmental-adaptation-control-switching processing unit 43 sets n to 1 (step S100) and communicates an nth combination of the communication parameters and the control gain simultaneously to the communication-parameter changing unit 26 and the control-gain changing unit 23 as the environmental adaptation control information 46 (step S110). Switching timing included in the environmental adaptation control information 46 can be set to synchronize with a communication period 36.

Subsequently, the drive-control-apparatus-detector communication unit 31 performs communication with the detector 3 based on the communication parameters changed by the communication-parameter changing unit 26 and, at the same time, the position-control processing unit 12 and the speed-control processing unit 13 performs position control processing and speed control processing based on the control gains changed by the control-gain changing unit 23 (step S120).

The communication abnormality counter 30 counts the number of times of communication abnormality of communication with the detector 3 (step S130) and stores the number of times of communication abnormality (step S140). The communication abnormality counter 30 determines whether a condition n≥N is satisfied (step S150). When the condition n≥N is not satisfied, the communication abnormality counter 30 increments n by 1 (step S160). Then, the environmental-adaptation control unit 28 returns to step S110 and repeats the operation explained above until the condition n≥N is satisfied.

When the condition n≥N is satisfied (step S150), the environmental-adaptation-control-switching processing unit 43 sets communication parameters and control parameters that minimize the number of times of communication abnormality among all combinations of the N communication parameters and the N control gains (step S170).

Timing for incrementing n by 1 in the initial setting mode may be automatically changed at a certain period or may be changed according to an external input. Timing for switching the communication parameters and the control gains is desirably set to coincide with the communication period 36. The control gains (the position control gain Kp and the speed control gain Kv) may be switched according to a time constant determined in advance.

Among all the combinations of the N communication parameters and the N control gains, the communication parameters and the control parameters that minimize the number of times of communication abnormality may be set. However, arbitrary communication parameters and control gains executed in the processing shown in FIG. 3 may be set as an initial state.

FIG. 4 is a flowchart for explaining the operation in the environmental adaptation control mode of the environmental-adaptation control unit shown in FIG. 1. In the environmental adaptation control mode, the environmental-adaptation-control-switching processing unit 43 shown in FIG. 2 can provide an environmental adaptation control threshold for determining implementation of the environmental adaptation control separately from an alarm threshold for determining the number of times of communication abnormality that triggers a communication alarm. The environmental adaptation control threshold can be set to a value smaller than the alarm threshold.

In FIG. 4, when the environmental adaptation control mode is selected, the drive-control-apparatus-detector communication unit 31 performs communication with the detector 3 based on the communication parameters and the control gains set in advance in the initial setting mode shown in FIG. 3 and, at the same time, the position-control processing unit 12 and the speed-control processing unit 13 perform position control processing and speed control processing (step S200).

When the own axis communication state information 45 indicating the number of times of communication abnormality of the own axis is smaller than the environmental adaptation control threshold set in advance (step S210), the environmental-adaptation-control-switching processing unit 43 continues, based on the communication parameters and the control gains set in advance, the communication with the detector 3 and the control processing by the position-control processing unit 12 and the speed-control processing unit 13.

When the own axis communication state information 45 is equal to or larger than the environmental adaptation control threshold determined in advance (step S210) and smaller than the alarm threshold determined in advance (step S220), the environmental-adaptation-control-switching processing unit 43 changes the communication parameters and the control gains based on the environmental adaptation control (step S230).

On the other hand, when the own axis communication state information 45 indicating the number of times of abnormality of the own axis exceeds the alarm threshold set in advance (step S220), the environmental-adaptation-control-switching processing unit 43 generates a communication abnormality alarm (step S240), stops the motor 4, and causes the display unit 27 to display the communication abnormality alarm.

Figure 5A:
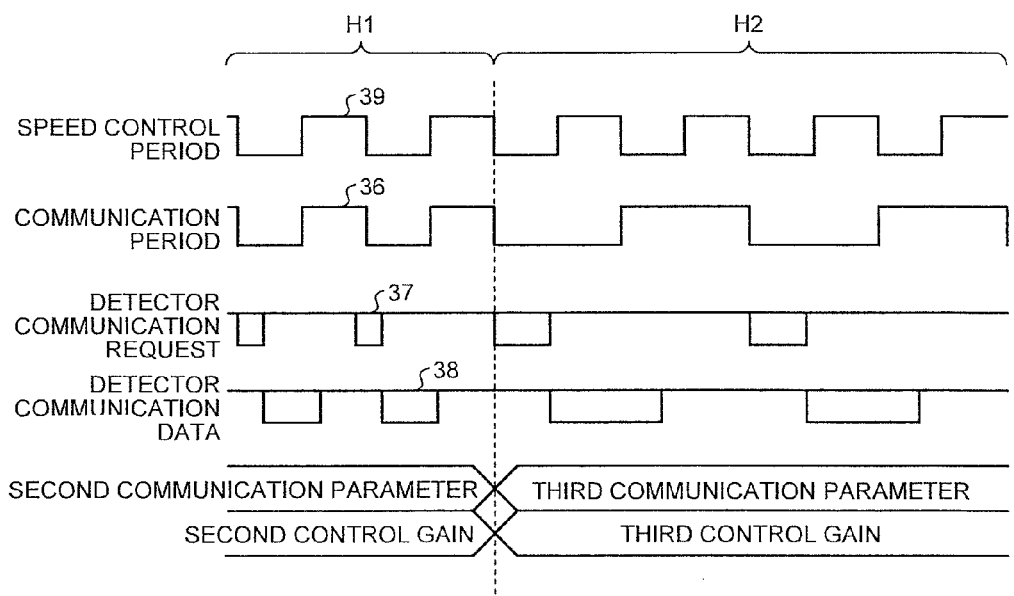
FIG. 5 is a timing chart for explaining the operation of the environmental-adaptation control unit shown in FIG. 1.
Figure 5B:
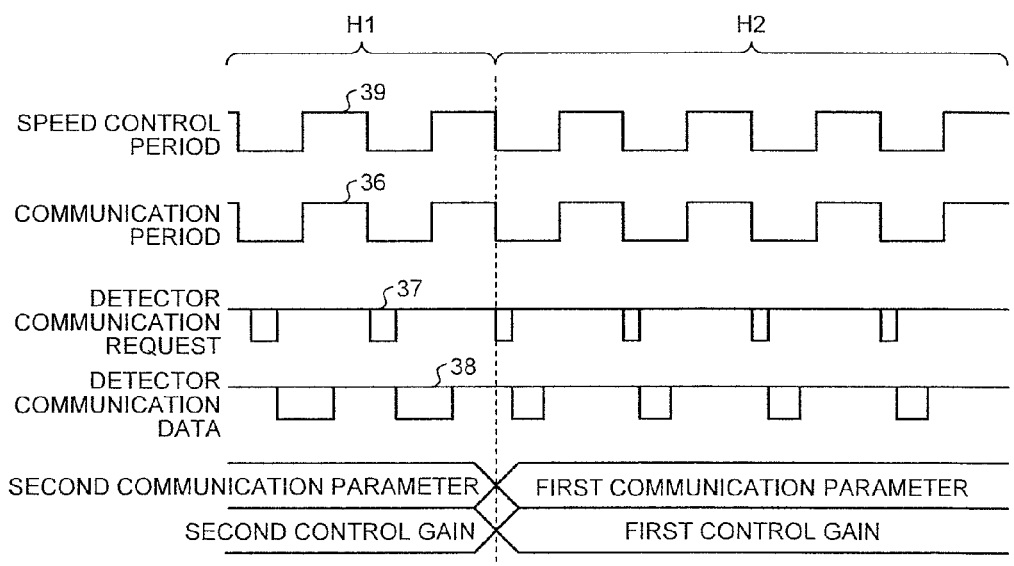

FIG. 5 is a timing chart for explaining the operation of the environmental-adaptation control unit shown in FIG. 1. Basically, for simplification of change processing, it is assumed that the communication period, the communication speed, and the reception digital filter are changed to half, one, and two times the communication period, the communication speed, and the reception digital filter. Because control processing becomes complicated, a speed control period 39 is not changed. In FIG. 5A, the communication speed is changed to half communication speed according the environmental adaptation control. In FIG. 5B, the communication speed is changed to double communication speed according to the environmental adaptation control.

In FIG. 5A, for example, it is assumed that, before environmental adaptation control H1, a second communication parameter and a second control gain are set. It is assumed that, after environmental adaptation control H2, the second communication parameter and the second control gain are changed to a third communication parameter and a third control gain and the communication period 36 and the reception digital filter are doubled and the communication speed is halved to reduce the control gains.

It is assumed that the drive-control-apparatus-detector communication unit 31 and the detector communication unit 32 can perform transmission and reception at speed up to half communication speed and double communication speed of communication speed set as a reference in advance.

When a condition that the own axis communication state information 45 is equal to or larger than the environmental adaptation control threshold and smaller than the alarm threshold is satisfied, the communication parameters and the control gains are switched in synchronization with timing of the communication period 36 after that. A detector communication request 37 is transmitted from the drive-control-apparatus-detector communication unit 31. At timing synchronizing with the communication period 36, communication with the detector 3 and control processing by the position-control processing unit 12 and the speed-control processing unit 13 are not performed. Therefore, even if the communication parameters and the control gains are switched, the communication processing and the control processing are not affected. The communication period 36, the communication speed, and the reception digital filter can also be changed from the motor drive control apparatus 2.

When the detector communication request 37 is transmitted from the drive-control-apparatus-detector communication unit 31, the detector 3 responds to the detector communication request 37. Detector communication data 38 including position information of the motor 4 is transmitted to the motor drive control apparatus 2. Therefore, a communication period of the detector 3 is changed to coincide with the communication period 36 of the motor drive control apparatus 2. The detector communication unit 32 of the detector 3 causes the detector-communication-parameter changing unit 34 to change the communication period P1' of the detector 3 based on the communication parameters stored in the detector-communication-parameter storing unit 33.

The detector communication unit 32 sets, in a section that can be received at half communication speed and in which communication data is determined, a pattern of a specific combination of '1' and '0' to detect communication speed from reception data and change the communication speed P2'. The detector communication unit 32 transmits, based on the detected communication speed, the detector communication data 38 to the motor drive control apparatus 2 and changes the reception digital filter P3' based on the communication parameters stored in the detector-communication-parameter storing unit 33.

In the case of FIG. 5A, after environmental adaptation control H2, the communication period 36 is doubled. Position information transmitted twice before environmental adaptation control H1 is transmitted from the detector 3 only once after environmental adaptation control H2. Therefore, the control-processing changing unit 44 performs change for not performing position information acquisition processing according to a change in the communication period 36.

On the other hand, in FIG. 5B, for example, it is assumed that, before environmental adaptation control H1, the second communication parameter and the second control gain are set. It is assumed that, after environmental adaptation control H2, the second communication parameter and the second control gain are changed to the first communication parameter and the first control gain are halved and the communication speed is doubled to change the control gains.

When it is assumed that the detector communication unit 32 of the detector 3 is a circuit that can perform reception at communication speed up to double communication speed, the detector communication unit 32 detects communication speed from the data pattern (the combination of '1' and '0') of the detector communication request 37 and receives the detector communication request 37. When the detector communication unit 32 receives the detector communication request 37, the detector communication unit 32 transmits the detector communication data 38 including the position information of the motor 4 to the motor drive control apparatus 2. The position information is received by the drive-control-apparatus-detector communication unit 31.

Furthermore, a message indicating the environmental adaptation control is performed is displayed on the display unit 27 based on switching timing included in the environmental adaptation control information 46.

Figure 6A:
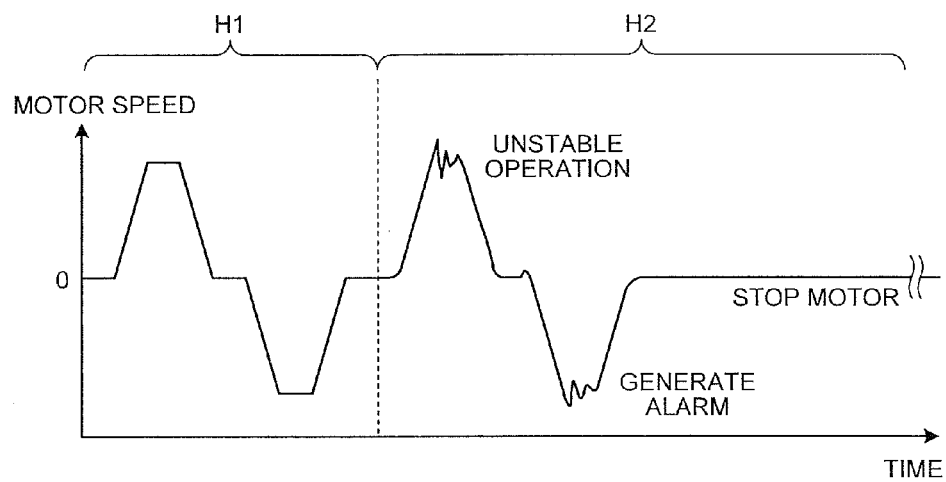
FIG. 6 is a diagram of switching patterns before and after environmental adaptation control of the environmental-adaptation control unit shown in FIG. 1.
Figure 6B:
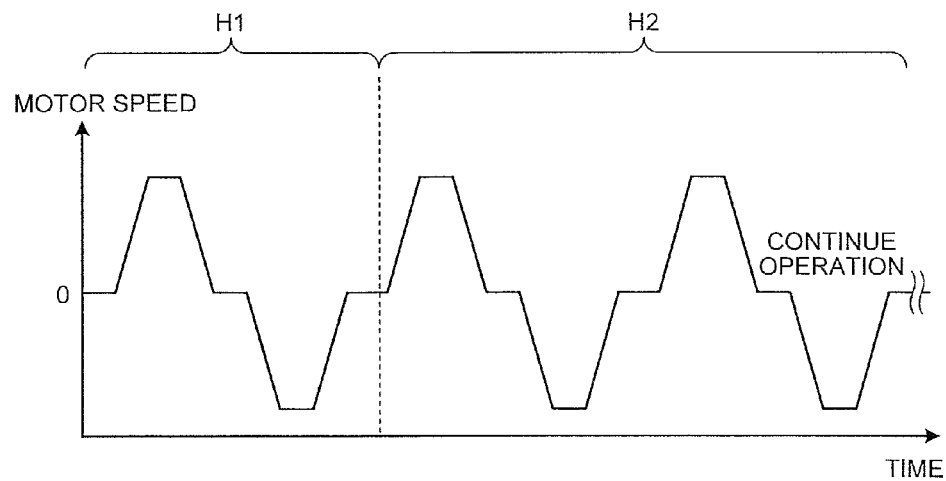

FIG. 6 is a diagram of switching patterns before and after the environmental adaptation control by the environmental-adaptation control unit shown in FIG. 1. FIG. 6A shows motor speed obtained when the command patterns or the control gains are not changed and the communication speed, the communication period, and the reception digital filter, which are the communication parameters, are respectively changed to half communication speed, a double communication period, and a double reception digital filter under an environment in which communication abnormality occurs. FIG. 6B shows motor speed obtained when the command patterns are not changed, the communication speed, the communication period, and the reception digital filter, which are the communication parameters, are respectively changed to half communication speed, a double communication period, and a double reception digital filter, and the speed control gain is changed to a half speed control gain under an environment in which communication abnormality occurs.

In FIG. 6A, because communication abnormality occurs before environmental adaptation control H1, when the command patterns or the control gains are not changed and the communication parameters are changed after environmental adaptation control H2, the operation of the motor 4 becomes unstable and the motor 4 is stopped.

On the other hand, as shown in FIG. 6B, because communication abnormality occurs before environmental adaptation control H1, when the command patterns are not changed and the communication parameters are changed and, at the same time, the control gains are changed after environmental adaptation control H2, it is possible to prevent the operation of the motor 4 from becoming unstable and continue the operation of the motor.

As explained above, according to the first embodiment, the communication parameters and the control gains can be changed in synchronization with each other under an environment in which communication abnormality occurs. Therefore, it is possible to continue stable operation without causing unstable operation of the motor 4 and it is possible to prevent the motor from stopping according to a communication abnormality alarm.

Because control gains (the position control gain Kp and the speed control gain Kv) can be changed in synchronization with the communication parameters (the communication period P1, the communication speed P2, and the reception digital filter P3) when communication cable length for communication with the detector 3 is short or under an environment in which a rate of occurrence of communication abnormality is low, communication speed can be increased and the delay time 21 can be reduced. Therefore, it is possible to improve responsiveness of motor drive control without reducing the speed control period 39 shown in FIG. 5. Because it is unnecessary to increase communication speed in advance assuming a worst case, it is possible to suppress an increase in cost of a system configuration.

Even in a state in which communication abnormality due to noise or the like does not actually occur, a motor operation in an environmental adaptation control state can be simulated according to the initial setting mode. Therefore, it is possible to check an operation state during the environmental adaptation control beforehand.

Furthermore, it is possible to cause the display unit 27 to display whether the communication parameters and the control gains of the environmental adaptation control are actually set in an own axis environmental adaptation control mode state or the communication parameters and the control gains of the environmental adaptation control are set in the initial setting mode. Therefore, it is possible to easily check a present state.

Second Embodiment

Figure 7:
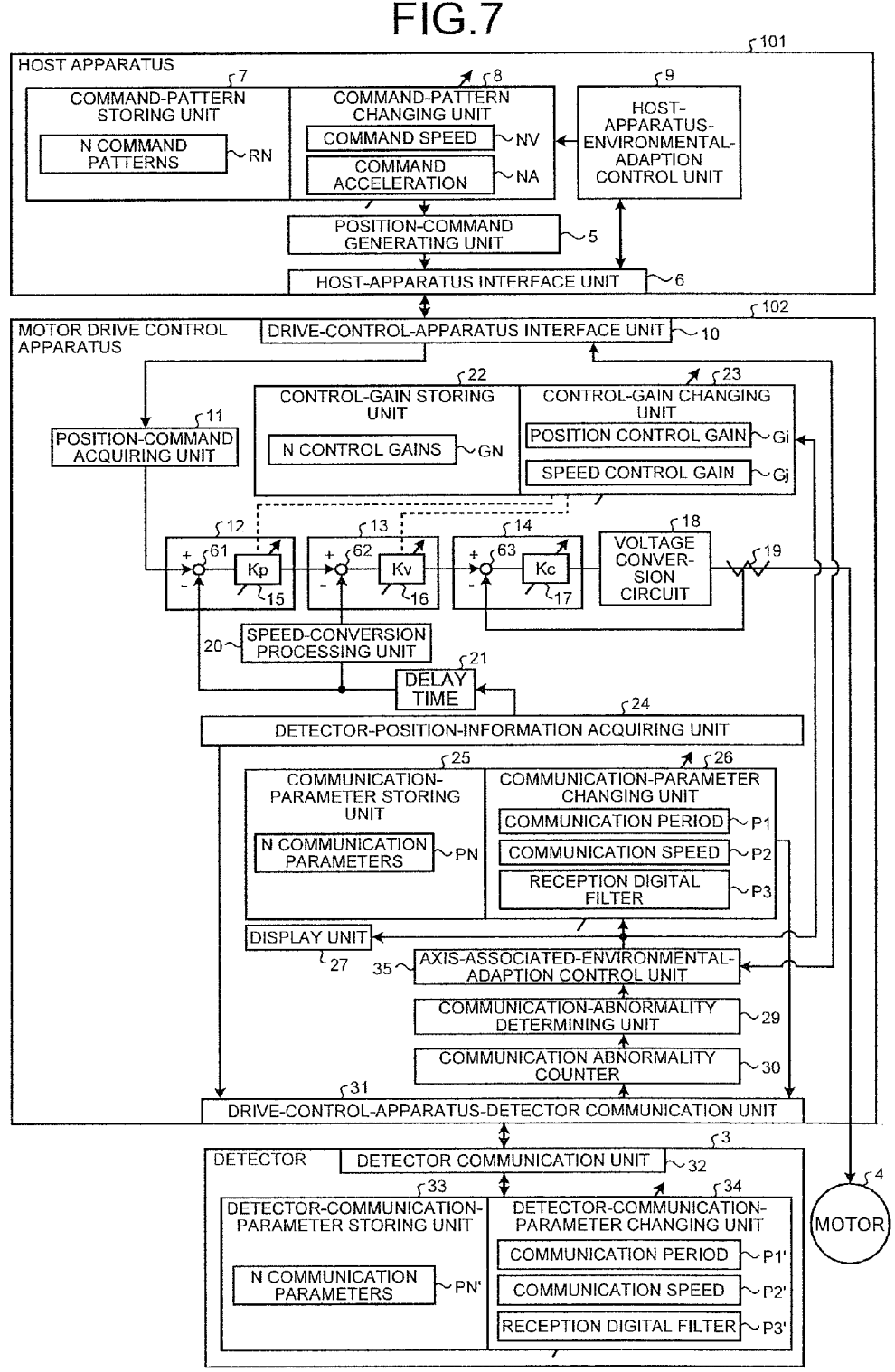
FIG. 7 is a block diagram of a schematic configuration of a second embodiment of the motor drive control apparatus according to the present invention.

FIG. 7 is a block diagram of a schematic configuration of a second embodiment of the motor drive control apparatus according to the present invention. In FIG. 7, a motor drive control apparatus 102 includes an axis-associated-environmental-adaptation control unit 35 instead of the environmental-adaptation control unit 28 of the motor drive control apparatus 2 shown in FIG. 1.

The axis-associated-environmental-adaptation control unit 35 can instruct, based on a determination result of the communication-abnormality determining unit 29, the control gains (the position control gain Kp and the speed control gain Kv) of the position-control processing unit 12 and the speed-control processing unit 13, the control-gain changing unit 23, the communication-parameter changing unit 26, and the drive-control-apparatus interface unit 10 to change the communication parameters (the communication period P1, the communication speed P2, and the reception digital filter P3) used for communication with the detector 3, and command patterns (command speed NV and command acceleration NA) used for generation of a position command in synchronization with one another.

The axis-associated-environmental-adaptation control unit 35 can change the communication parameters (the communication period P1, the communication speed P2, and the communication digital filter P3), the control gain (the position control gain Kp and the speed control gain Kv), and the command patterns (the command speed NV and the command acceleration NA) concerning the own axis in association with a change of the communication parameters (the communication period P1, the communication speed P2, and the reception digital filter P3), the control gains, and the command patterns concerning the other axes.

A host apparatus 101 includes a command-pattern storing unit 7, a command-pattern changing unit 8, and a host-apparatus-environmental-adaptation control unit 9 in addition to the components of the host apparatus 1 shown in FIG. 1.

The command-pattern storing unit 7 can store N command patterns RN in advance.

The command-pattern changing unit 8 can change, based on command pattern change information from the host-apparatus-environmental-adaptation control unit 9, command patterns used for generation of a position command to any one of the N command patterns RN stored in the command-pattern storing unit 7. Examples of the command patterns RN include the command speed NV and the command acceleration NA.

The host-apparatus-environmental-adaptation control unit 9 can generate, based on an instruction for changing a command pattern output from the axis-associated-environmental-adaptation control unit 35, timing for switching the command pattern and instruct the command-pattern changing unit 8 to change the command pattern.

Figure 8:
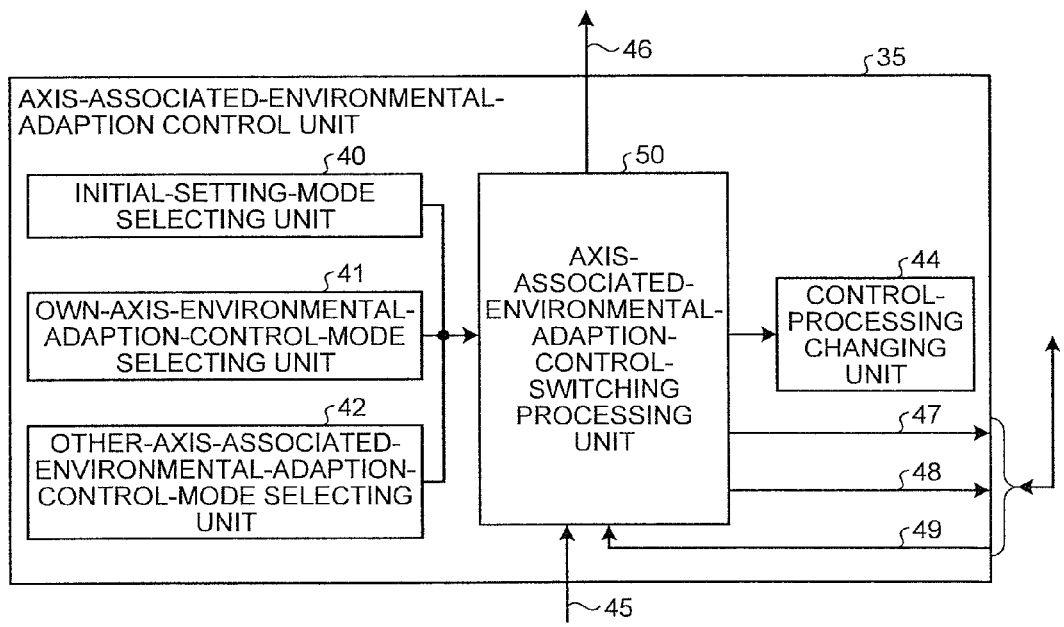
FIG. 8 is a block diagram of a schematic configuration of an axis-associated-environmental-adaptation control unit shown in FIG. 7.

FIG. 8 is a block diagram of a schematic configuration of the axis-associated-environmental-adaptation control unit shown in FIG. 7. In FIG. 8, the axis-associated-environmental-adaptation control unit 35 includes an axis-associated-environmental-adaptation-control-switching processing unit 50 instead of the environmental-adaptation-control-switching processing unit 43 shown in FIG. 2 and separately includes an other-axis-associated-environmental-adaptation-control-mode selecting unit 42.

When an other axis associated environmental adaptation control mode is selected, the other-axis-associated-environmental-adaptation-control-mode selecting unit 42 can instruct the axis-associated-environmental-adaptation-control-switching processing unit 50 to operate in the other axis associated environmental adaptation control mode.

When the own axis environmental adaptation control mode is selected, the axis-associated-environmental-adaptation-control-switching processing unit 50 can change, based on the own axis communication state information 45 corresponding to the number of times of communication abnormality from the communication-abnormality determining unit 29, the position control gain Kp and the speed control gain Kv, the communication period P1, the communication speed P2, and the reception digital filter P3, and the command speed NV and the command acceleration NA in synchronization with one another when the number of times of communication abnormality meets a condition set in advance. To change the position control gain Kp and the speed control gain Kv, the communication period P1, the communication speed P2, and the reception digital filter P3, and the command speed NV and the command acceleration NA in synchronization with one another, the axis-associated-environmental-adaptation-control-switching processing unit 50 can output the environmental adaptation control information 46 to the communication-parameter changing unit 26 and the control-gain changing unit 23 and output own axis environmental adaptation control information 47 to the host apparatus 101.

In the axis-associated-environmental-adaptation-control-switching processing unit 50, when the other axis associated environmental adaptation control mode is selected, even if a condition under which the own axis performs the environmental adaptation control is not satisfied, the own axis can perform the environmental adaptation control in association with the other axis when a condition under which the other axis performs the environmental adaptation control. A combination of axes associated with each other can be determined in advance. The axis-associated-environmental-adaptation-control-switching processing unit 50 can output other axis associated environmental adaptation control information 48 indicating that the own axis is performing the environmental adaptation control that the own axis performs in association with the other axis when the condition under which the other axis performs the environmental adaptation control is satisfied.

When the initial setting mode is selected, the axis-associated-environmental-adaptation-control-switching processing unit 50 can check an operation state during the own axis environmental adaptation control beforehand by simulating a motor operation in the own axis environmental adaptation control state.

Figure 9:
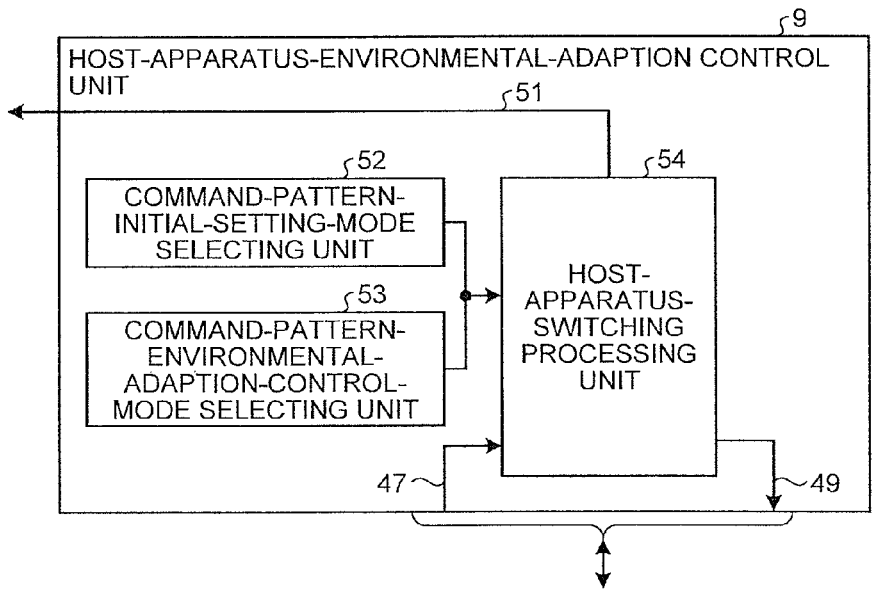
FIG. 9 is a block diagram of a schematic configuration of a host-apparatus-environmental-adaptation control unit shown in FIG. 7.

FIG. 9 is a block diagram of a schematic configuration of the host-apparatus-environmental-adaptation control unit shown in FIG. 7. In FIG. 9, the host-apparatus-environmental-adaptation control unit 9 includes a command-pattern-initial-setting-mode selecting unit 52, a command-pattern-environmental-adaptation-control-mode selecting unit 53, and a host-apparatus-switching processing unit 54.

When a command pattern initial setting mode is selected, the command-pattern-initial-setting-mode selecting unit 52 can instruct the host-apparatus-switching processing unit 54 to operate in the command pattern initial setting mode.

When a command pattern environmental adaptation control mode is selected, the command-pattern-environmental-adaptation-control-mode selecting unit 53 can instruct the host-apparatus-switching processing unit 54 to operate in the command pattern environmental adaptation control mode.

When the command pattern environmental adaptation control mode is selected, the host-apparatus-switching processing unit 54 can issue, according to the own axis environmental adaptation control information 47 of plural axes connected to the host apparatus 101 and a combination of axes associated with one another determined in advance, command changing pattern information 51 to axes that change a command pattern in association with each other. When the own axis environmental adaptation control information 47 of the plural axes connected to the host apparatus 101 and the own axis environmental adaptation control information 47 of any one axis of the combination of the axes associated with one other determined in advance are transmitted, the host-apparatus-switching processing unit 54 can issue an other axis associated environmental adaptation control command 49 to all the axes associated with one another.

When the command pattern initial setting mode is selected, the host-apparatus-switching processing unit 54 can check an operation state during the command pattern environmental adaptation control beforehand by simulating a motor operation a command pattern environmental adaptation control state.

Figure 10:
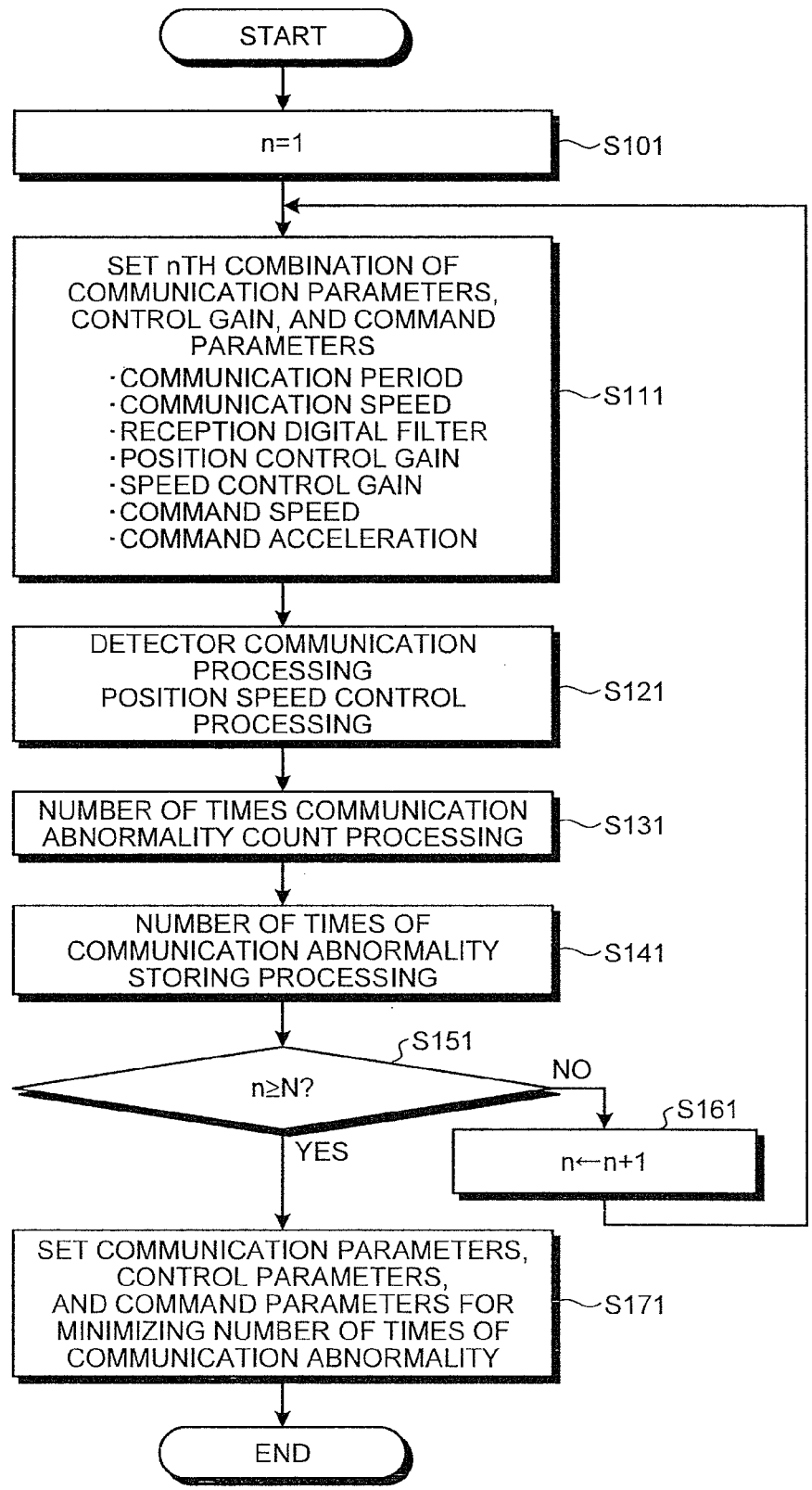
FIG. 10 is a flowchart for explaining the operation in an initial setting mode of the axis-associated-environmental-adaptation control unit shown in FIG. 7.

FIG. 10 is a flowchart for explaining the operation in the initial setting mode of the axis-associated-environmental-adaptation control unit shown in FIG. 7. In FIG. 10, when the initial setting mode is selected, the axis-associated-environmental-adaptation-control-switching processing unit 50 sets n to 1 (step S101) and communicates an nth combination of the communication parameters, the speed control gain, and the command patterns simultaneously to the communication-parameter changing unit 26 and the control-gain changing unit 23 as the environmental adaptation control information 46 and communicates the nth combination simultaneously to the host-apparatus-switching processing unit 54 as the own axis environmental adaptation control information 47 (step S111). Switching timing included in the environmental adaptation control information 46 and the own axis environmental adaptation control information 47 can be set to synchronize with the communication period 36.

Subsequently, the drive-control-apparatus-detector communication unit 31 performs communication with the detector 3 based on the communication parameters changed by the communication-parameter changing unit 26 and, at the same time, the position-control processing unit 12 and the speed-control processing unit 13 perform position control processing and speed control processing based on the command patterns changed by the command-pattern changing unit 8 and the control gains changed by the control-gain changing unit 23 (step S121).

The communication abnormality counter 30 counts the number of times of communication abnormality of communication with the detector 3 (step S131) and stores the number of times of communication abnormality (step S141). The communication abnormality counter 30 determines whether a condition n≥N is satisfied (step S151). When the condition n≥N is not satisfied, the communication abnormality counter 30 increments n by 1 (step S161). Then, the axis-associated-environmental-adaptation control unit 35 returns to step S111 and repeats the operation explained above until the condition n≥N is satisfied.

When the condition n≥N is satisfied (step S151), the axis-associated-environmental-adaptation-control-switching processing unit 50 sets communication parameters, control parameters, and command parameters that minimize the number of times of communication abnormality among all combinations of the N communication parameters, the N control gains, and the N command patterns (step S171).

Figure 11:
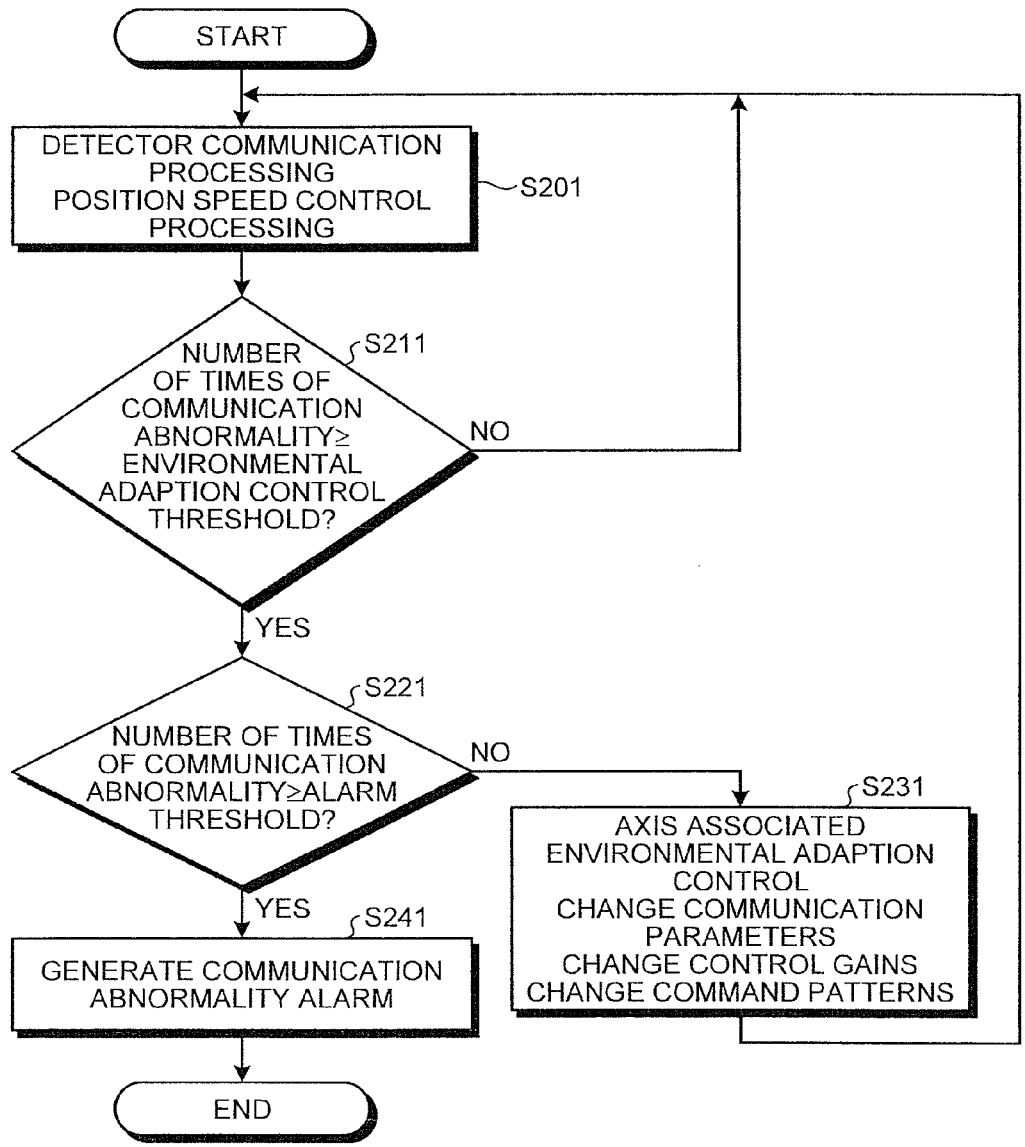
FIG. 11 is a flowchart for explaining the operation in an own-axis-environmental adaptation control mode of the axis-associated-environmental-adaptation control unit shown in FIG. 7.

FIG. 11 is a flowchart for explaining the operation in the own axis environmental adaptation control mode of the axis-associated-environmental-adaptation control unit shown in FIG. 7. In FIG. 11, when the own axis environmental adaptation control mode is selected, the drive-control-apparatus-detector communication unit 31 performs communication with the detector 3 based on the communication parameters, the control gains, and the command patterns set in advance in the initial setting mode shown in FIG. 10 and, at the same time, the position-control processing unit 12 and the speed-control processing unit 13 perform position control processing and speed control processing (step S201).

When the own axis communication state information 45 indicating the number of times of communication abnormality of the own axis is smaller than the environmental adaptation control threshold set in advance (step S211), the axis-associated-environmental-adaptation-control-switching processing unit 50 continues, based on the communication parameters, the control gains, and the command patterns set in advance, the communication with the detector 3 and the control processing by the position-control processing unit 12 and the speed-control processing unit 13.

When the own axis communication state information 45 is equal to or larger than the environmental adaptation control threshold determined in advance (step S211) and smaller than the alarm threshold determined in advance (step S221), the axis-associated-environmental-adaptation-control-switching processing unit 50 changes the communication parameters, the control gains, and the command patterns based on the environmental adaptation control (step S231).

On the other hand, when the own axis communication state information 45 indicating the number of times of abnormality of the own axis exceeds the alarm threshold set in advance (step S221), the axis-associated-environmental-adaptation-control-switching processing unit 50 generates a communication abnormality alarm (step S241), stops the motor 4, and causes the display unit 27 to display the communication abnormality alarm.

Figure 12A:
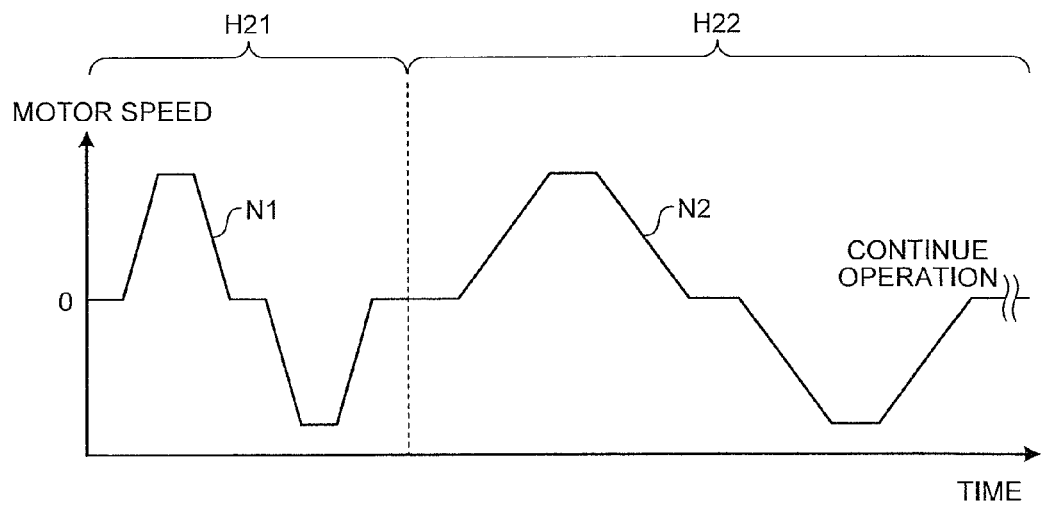
FIG. 12 is a timing chart for explaining a method of switching a command pattern of the host-apparatus-environmental-adaptation control unit shown in FIG. 7.
Figure 12B:
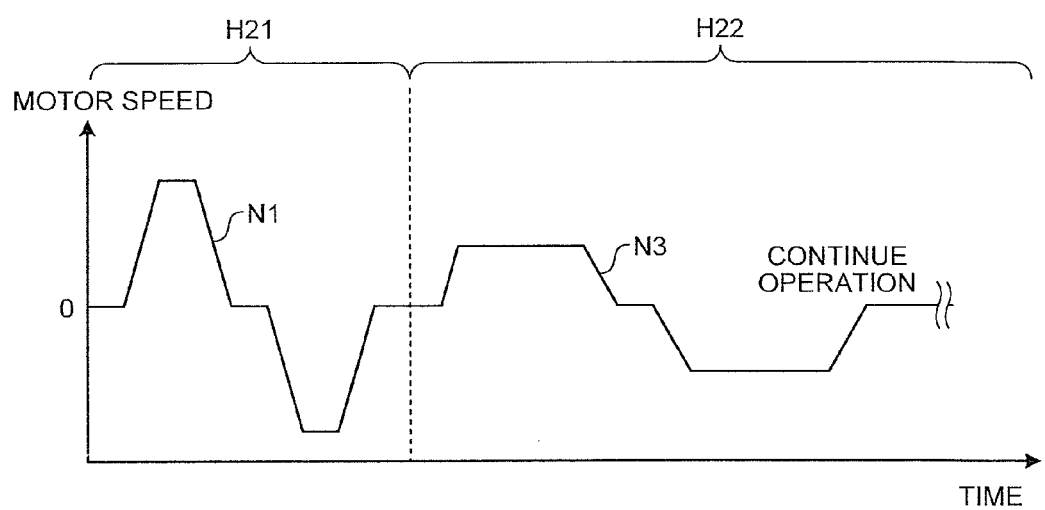

FIG. 12 is a timing chart for explaining a method of switching a command pattern of the host-apparatus-environmental-adaptation control unit shown in FIG. 7. FIG. 12A shows motor speed obtained when the communication parameters and the control gains are changed and, at the same time, the command acceleration is halved under an environment in which communication abnormality occurs. FIG. 12B shows motor speed obtained when the communication parameters and the control gains are changed and, at the same time, the command speed is halved under an environment in which communication abnormality occurs.

For example, to smoothly change a command pattern, timing when the command pattern is changed is desirably set in a boundary where one cycle of the command pattern ends and shifts to the next cycle.

Consequently, the command patterns (the command speed and the command acceleration) can also be changed simultaneously with a change of the communication parameters and the control gains under an environment in which communication abnormality occurs. An estimated error of position information that occurs when communication abnormality occurs can be reduced. Therefore, it is possible to realize a stable operation of the motor 4 and continue the operation of the motor 4 without being stopped according to a communication alarm.

Even in a state in which communication abnormality due to noise or the like does not actually occur, a motor operation in an environmental adaptation control state can be simulated according to the initial setting mode. Therefore, it is possible to check an operation state during the environmental adaptation control beforehand. As a result, even in a communication environment in which communication abnormality occurs, it is possible to drive the motor 4 according to the communication patterns, the control gains, and the command patterns determined in advance for continuing an operation without stopping the motor 4.

An operation performed when the other axis associated environmental adaptation control mode is selected is explained.

When the other axis associated environmental adaptation control mode is selected, in the axis-associated-environmental-adaptation-control-switching processing unit 50 shown in FIG. 8, in the same manner as the processing performed when the own axis environmental adaptation control mode is selected, based on the own axis communication state information 45, which is the number of times of communication abnormality, from the communication-abnormality determining unit 29, the communication parameters (the communication period, the communication speed, and the reception digital filter) and the control gains (the position control gain and the speed control gain) are changed in synchronization with each other when the number of times of communication abnormality reaches a range set in advance. When the control gains (the position control gain and the speed control gain) are switched, a time constant may be set for the control gains.

The axis-associated-environmental-adaptation-control-switching processing unit 50 outputs the own axis environmental adaptation control information 47 indicating that the own axis is performing the environmental adaptation control for changing the communication parameters and the control gains based on the number of times of communication abnormality of the own axis and the other axis associated environmental adaptation control information 48 indicating that the own axis is performing the environmental adaptation control performed by the own axis in association with the other axis when a condition under which the other axis performs the environmental adaptation control is satisfied.

When the own axis environmental adaptation control information 47 of the plural axes connected to the host apparatus 101 and the own axis environmental adaptation control information 47 of any one axis of the combination of the axes associated with one other determined in advance are transmitted, the other axis associated environmental adaptation control command 49 is issued to all the axes associated with one another from the host-apparatus-switching processing unit 54.

In the axis-associated-environmental-adaptation-control-switching processing unit 50, the communication parameters (the communication period, the communication speed, and the reception digital filter) and the control gain (the position control gain and the speed control gain) are changed in synchronization with the other axis associated environmental adaptation control command 49 transmitted from the host-apparatus-switching processing unit 54.

From the host-apparatus-switching processing unit 54, the command changing pattern information 51 is issued to axes that change a command pattern in association with each other according to the own axis environmental adaptation control information 47 of plural axes connected to the host apparatus 101 and a combination of axes associated with one another determined in advance.

When the command changing pattern information 51 is issued from the host-apparatus-switching processing unit 54, in the command-pattern changing unit 8 shown in FIG. 7, a command pattern used for generation of a position command is changed to any one of the N command patterns RN stored in the command-pattern storing unit 7.

Consequently, under an environment in which communication abnormality occurs, it is possible to change the communication parameters, the control gains, and the command patterns of the own axis in synchronization with a change of the communication parameters, the control gains, and the command patterns of the other axis. When an interpolation operation for the motor 4 having two or more axes is performed in an X-Y table, it is possible to change control gains and command patterns of the axes together and continue operation.

INDUSTRIAL APPLICABILITY

As explained above, the motor drive control apparatus according to the present invention can change the communication parameters and the control gains in synchronization with each other according to a communication environment of communication with the detector. The motor drive control apparatus is suitable for a method of continuing the operation of the motor even under an environment in which a rate of occurrence of communication abnormality of communication with the detector is high.

REFERENCE SIGNS LIST

1, 101 HOST APPARATUSES
2, 102 MOTOR DRIVE CONTROL APPARATUSES
3 DETECTOR
4 MOTOR
5 POSITION-COMMAND GENERATING UNIT
6 HOST-APPARATUS INTERFACE UNIT
7 COMMAND-PATTERN STORING UNIT
8 COMMAND-PATTERN CHANGING UNIT
9 HOST-APPARATUS-ENVIRONMENTAL-ADAPTATION CONTROL UNIT
10 DRIVE-CONTROL-APPARATUS INTERFACE UNIT
11 POSITION-COMMAND ACQUIRING UNIT
12 POSITION-CONTROL PROCESSING UNIT
13 SPEED-CONTROL PROCESSING UNIT
14 CURRENT-CONTROL PROCESSING UNIT
15 POSITION-CONTROL-GAIN MULTIPLIER
16 SPEED-CONTROL-GAIN MULTIPLIER
17 CURRENT-CONTROL-GAIN MULTIPLIER
18 VOLTAGE CONVERTING CIRCUIT
19 CURRENT DETECTOR
20 SPEED-CONVERSION PROCESSING UNIT
21 DELAY TIME
22 CONTROL-GAIN STORING UNIT
23 CONTROL-GAIN CHANGING UNIT
24 DETECTOR-POSITION-INFORMATION ACQUIRING UNIT
25 COMMUNICATION-PARAMETER STORING UNIT
26 COMMUNICATION-PARAMETER CHANGING UNIT
27 DISPLAY UNIT
28 ENVIRONMENTAL-ADAPTATION CONTROL UNIT
29 COMMUNICATION-ABNORMALITY DETERMINING UNIT
30 COMMUNICATION ABNORMALITY COUNTER
31 DRIVE-CONTROL-APPARATUS-DETECTOR COMMUNICATION UNIT
32 DETECTOR COMMUNICATION UNIT
33 DETECTOR-COMMUNICATION-PARAMETER STORING UNIT
34 DETECTOR-COMMUNICATION-PARAMETER CHANGING UNIT
35 AXIS-ASSOCIATED-ENVIRONMENTAL-ADAPTATION CONTROL UNIT
36 COMMUNICATION PERIOD
37 DETECTOR COMMUNICATION REQUEST
38 DETECTOR COMMUNICATION DATA
39 SPEED CONTROL PERIOD
40 INITIAL-SETTING-MODE SELECTING UNIT
41 OWN-AXIS-ENVIRONMENTAL-ADAPTATION-CONTROL-MODE SELECTING UNIT
42 OTHER-AXIS-ASSOCIATED-ENVIRONMENTAL-ADAPTATION-CONTROL-MODE SELECTING UNIT
43 ENVIRONMENTAL-ADAPTATION-CONTROL-SWITCHING PROCESSING UNIT
44 CONTROL-PROCESSING CHANGING UNIT
45 OWN AXIS COMMUNICATION STATE INFORMATION
46 ENVIRONMENTAL ADAPTATION CONTROL INFORMATION
47 OWN AXIS ENVIRONMENTAL ADAPTATION CONTROL INFORMATION
48 OTHER AXIS ASSOCIATED ENVIRONMENTAL ADAPTATION CONTROL INFORMATION
49 OTHER AXIS ASSOCIATED ENVIRONMENTAL ADAPTATION CONTROL COMMAND
50 AXIS-ASSOCIATED-ENVIRONMENTAL-ADAPTATION-CONTROL-SWITCHING PROCESSING UNIT
51 COMMAND CHANGING PATTERN INFORMATION
52 COMMAND-PATTERN-INITIAL-SETTING-MODE SELECTING UNIT
53 COMMAND-PATTERN-ENVIRONMENTAL-ADAPTATION-CONTROL-MODE SELECTING UNIT
54 HOST-APPARATUS-SWITCHING PROCESSING UNIT
61 to 63 SUBTRACTERS

The invention claimed is:

1. A motor drive control apparatus comprising:
 a control-gain changing unit that changes control gains constituted by speed control gains and position control gains;
 a communication-parameter changing unit that changes communication parameters constituted by a communication period, communication speed, and a reception digital filter;
 a communication-abnormality determining unit that determines abnormality of a communication state; and
 an environmental-adaptation control unit that instructs, based on a determination result of the communication-abnormality determining unit, the control-gain changing unit and the communication-parameter changing unit to change the control gains and the communication parameters in synchronization with each other.

2. The motor drive control apparatus according to claim 1, wherein the environmental-adaptation control unit causes the control-gain changing unit and the communication-parameter changing unit to change the control gains and the communication parameters to minimize a number of times of abnormality of the communication state.

3. The motor drive control apparatus according to claim 2, wherein, when the control-gain changing unit and the communication-parameter changing unit are instructed by the environmental-adaptation control unit to change the control gains and the communication parameters in synchronization with each other, the control-gain changing unit switches the control gains according to a time constant determined in advance.

4. The motor drive control apparatus according to claim 1, wherein the environmental-adaptation control unit causes the control-gain changing unit and the communication-parameter changing unit to change the control gains and the communication parameters to make a number of times of abnormality of the communication state to be smaller than or equal to a predetermined value.

5. The motor drive control apparatus according to claim 4, wherein, when the control-gain changing unit and the communication-parameter changing unit are instructed by the environmental-adaptation control unit to change the control gains and the communication parameters in synchronization with each other, the control-gain changing unit switches the control gains according to a time constant determined in advance.

6. The motor drive control apparatus according to claim 1, wherein, when the control-gain changing unit and the communication-parameter changing unit are instructed by the environmental-adaptation control unit to change the control gains and the communication parameters in synchronization with each other, the control-gain changing unit switches the control gains according to a time constant determined in advance.

7. A motor drive control apparatus comprising:
 a control-gain changing unit that changes control gains constituted by speed control gains and position control gains;
 a communication-parameter changing unit that changes communication parameters constituted by a communication period, communication speed, and a reception digital filter;
 an interface unit that receives command patterns;
 a communication-abnormality determining unit that determines abnormality of a communication state; and
 an axis-associated-environmental-adaptation control unit that instructs, based on a determination result of the communication-abnormality determining unit, the control-gain changing unit, the communication-parameter changing unit, and the interface unit to change the control gains, the communication parameters, and the command patterns in synchronization with one another.

8. The motor drive control apparatus according to claim 7, wherein the axis-associated-environmental-adaptation control unit causes the control-gain changing unit and the communication-parameter changing unit to change the control gains and the communication parameters concerning its own axis, in association with a change of the control gains and the communication parameters of an other axis, if the own axis and the other axis are associated with one another in advance.

9. The motor drive control apparatus according to claim 7, wherein the axis-associated-environmental-adaptation control unit causes the control-gain changing unit, the communication-parameter changing unit, and the interface unit to change the control gains, the communication parameters, and the command patterns concerning its own axis in association with a change of the control gains, the communication parameters, and the command patterns of an other axis, if the own axis and the other axis are associated with each other in advance.

* * * * *